Oct. 20, 1970    HUGH L. DRYDEN, DEPUTY    3,535,179
ADMINISTRATOR OF THE NATIONAL AERONAUTICS
AND SPACE ADMINISTRATION
METHOD OF MAKING A FILAMENT-WOUND CONTAINER
Original Filed Oct. 29, 1965
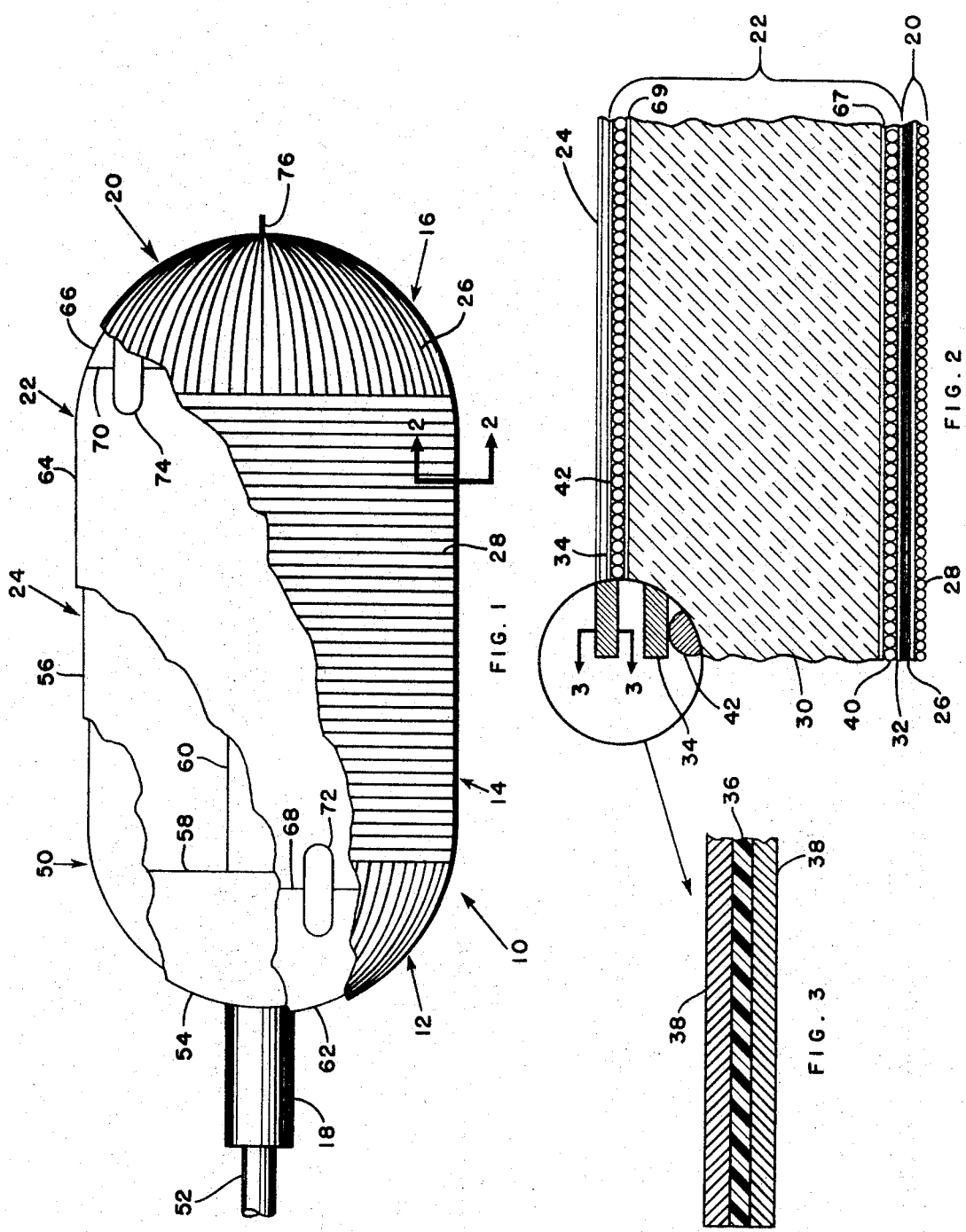
INVENTOR
CLEM B. SHRIVER
BY
ATTORNEYS 3,535,179
METHOD OF MAKING A FILAMENT-WOUND CONTAINER

Hugh L. Dryden, Deputy Administrator of the National Aeronautics and Space Administration, with respect to an invention of Clem B. Shriver, Clinton, Ohio
Original application Oct. 29, 1965, Ser. No. 505,765, now Patent No. 3,392,865. Divided and this application Aug. 11, 1967, Ser. No. 669,336
Int. Cl. B31c 9/00
U.S. Cl. 156—172                    3 Claims

ABSTRACT OF THE DISCLOSURE

Fabricating a container for storing cryogenic material by covering a polystyrene foam mandrel with an impermeable material, assembling insulation on the mandrel and then wrapping the insulation with resin impregnated filaments. The filaments are cured to form a structural shell, and the winding mandrel is removed from the interior of the container. The insulation is made by encapsulating foam in a vacuum tight casing to prevent gas cryopumping. A bleeder ply is positioned between the foam and the casing to provide a conductance path thereby facilitating the removal of gases.

ORIGIN OF THE INVENTION

The invention described was made in the performance of work under a NASA contract and is subject to the provisions of Section 305 of the National Aeronautics and Space Act of 1958, Public Law 85–568 (72 Stat. 435, 42 U.S.C. 2457).

RELATED INVENTION

This application is a division of application Ser. No. 505,765 which was filed Oct. 29, 1965, now U.S. Pat. No. 3,392,865.

This invention is concerned with the fabrication of a lightweight reinforced plastic container having improved insulation. More particularly, the invention relates to a method of making an insulated filament-wound tank for storing cryogenic fluids.

The potential performance of liquid fueled rockets can be improved by reducing the weight of the propellant storage tanks. In the case of liquid hydrogen fueled rockets, the fuel storage tanks are much larger than containers for storing other liquids because of the low density of this propellant. Thus, the need for a lightweight tank structure for storing liquid hydrogen becomes evident, and filament-wound structures are desirable because of their weight reduction features.

A lightweight liquid propellant storage tank constructed in accordance with the present invention has a load carrying reinforced plastic shell constructed by filament-winding. The structure further utilizes a thin impermeable liner inside the shell that is capable of containing liquid or gaseous hydrogen. An internal lightweight thermal protection system employing low density plastic foam encapsulated in a vacuum-tight casing is interposed between the shell and the liner.

Closed cell polyurethane foam is used in the thermal protection system, and when this type of foam is adhered to an impermeable vacuum jacket material interstitial gas trapped at the foam to jacket interface normally cannot be removed. In such a situation, detection of leaks in the vacuum jacket is difficult, and the inability to remove gases cryopumped into the foam can cause catastrophic failures during warm-up.

The problem of detecting gas leakage through the vacuum jacket into the foam and the removal of gases has been solved by the present invention. In a thermal protection system constructed in accordance with the present invention a layer of dry cloth is incorporated at the foam to vacuum jacket interface which forms a bleeder ply to provide a gas conductance path to a pressure tap.

It is, therefore, an object of the present invention to provide an improved lightweight container for storing cryogenic fluids having a reliable insulation system.

Another object of the invention is to provide a rocket propellant storage tank having a lightweight thermal protection system which employs a low density plastic foam that is encapsulated in a vacuum-tight casing in such a manner as to enable leaks to be detected while monitoring the pressure within the insulation.

Still another object of the invention is to provide a thermal protection system for a lightweight plastic reinforced tank which utilizes a dry cloth bleeder ply located at the interface between a layer of closed cell plastic foam and a vacuum jacket to provide a gas conductance path thereby facilitating the rapid detection and vacuum pumping of small leaks in the vacuum jacket.

These and other objects and advantages of the invention will be apparent from the specification which follows and from the drawings wherein like numerals are used throughout to identify like parts.

In the drawings.

FIG. 1 shows a lightweight plastic container with parts broken away constructed in accordance with the present invention;

FIG. 2 is an enlarged section view taken along the line 2—2 in FIG. 1; and

FIG. 3 is an enlarged section view taken along the line 3—3 in FIG. 2.

Referring now to FIG. 1, there is shown a container 10 which has a cylindrical configuration with domed ends and embodies the features of the present invention. By way of illustrating the weight-saving feature of a tank constructed in accordance with the present invention, a container 10 having a diameter of 18 inches and an overall length of 36 inches with a design maximum test pressure of 100 p.s.i. had a weight of 12.25 pounds. The container 10 includes an upper dome section 12, a central cylindrical section 14 and a lower dome section 16. A metal fill tube 18 extends through the upper dome section 12 to the interior of the container 10.

Referring to FIG. 2, the container 10 comprises three main components in juxtaposition. The first of these components is a filament-wound fiberglass shell 20 which forms the outer surface of the container 10. An insulation system 22 is positioned adjacent the shell 20, and an impermeable cryogenic liner 24 is located inside the shell.

The shell 20 is designed to effect a low shell strain at the design test pressure thereby reducing the accumulative thermal shrink and internal pressurization strains on the insulation system 22 and the liner 24. The aforementioned tank had a design test pressure of 100 p.s.i. The shell 20 is of a balanced design and comprises a full 360° longitudinal wrap of two layers of glass roving 26 and four layers of circumferentially wrapped glass roving 28.

The insulation system 22 is located on the inside of the filament-wound structural shell 20 for optimum efficiency. In this manner, the insulation is protected from damage during handling of the container 10 while providing a back-up liner assembly. However, it is contemplated that in certain installations it may be desirable to place the insulation outside the shell.

The insulation system 22 is construced of closed cell foam 30 encased in a vacuum-tight cover including an outer jacket 32 and an inner jacket 34. The thickness of the foam is selected to insure ease in fabrication while the foam density is selected on the basis of load carrying capacity. By way of illustration, foam insulation having a thickness of 0.5 inch and a density of four pounds per cubic foot was used in the aforementioned tank.

The foam 30 provides a structural media for transmitting pressure loads to the external filament-wound structural shell 20 when the pressure inside the insulation 22 is reduced by cryopumping. The cryopumping phenomena which takes place within the foam 30 during storage of cryogenic liquids is beneficial to the performance of the insulation system 22. The reliability of the insulation system 22 depends on the vacuum jackets 32 and 34 remaining leak tight throughout the useful life of the container 10.

The impermeable liner 24 is located inside the insulation system 22 but is not attached to the inner jacket 34. The liner 24 comprises a laminated structure shown in FIG. 3 which had a thickness of 0.005 inch in the previously mentioned tank. This laminate includes a layer 36 of plastic film such as Mylar having a layer 38 of a thin metal foil such as aluminum laminated to both surfaces. This aluminum-Mylar-aluminum foil laminate is designated as AMA and was utilized for the liner 24 to facilitate bonding of various sections of the liner during fabrication.

The vacuum jackets 32 and 34 which form the vacuum-tight cover around the foam 30 are identical with the impermeable liner 24 of AMA shown in FIG. 3. While an aluminum-Mylar-aluminum laminate, AMA, was used for the cryogenic liner and vacuum-tight casing which encapsulates the foam insulation in the previously described tank, it is contemplated other laminates comprising at least one layer of a plastic film and at least one layer of a thin metal foil may be used. For example, a Mylar-aluminum-Mylar laminate, MAM, may be used where it is desirable to have the plastic film on the outer surface. In a preferred embodiment where the vacuum sealing is the prime consideration a Mylar-aluminum-aluminum-Mylar laminate, MAAM, should be used. Other factors to be taken into consideration in selecting the laminate are its ability to be formed and bonded. It may be desirable in certain applications to use thin metal foils other than aluminum.

An important feature of the present invention is the incorporation of a bleeder ply at the foam to vacuum jacket interface to provide a gas conductance path. As shown in FIG. 2, a layer of dry glass cloth 40 is provided between the foam 30 and the outer vacuum jacket 32. A similar dry glass cloth layer 42 is interposed between the foam 30 and the inner vacuum jacket 34.

Each layer of glass cloth 40 and 42 forms a bleeder ply which facilitates leak checking of the vacuum jacket and permits monitoring of the pressure within the insulation system 22 during performance testing of the container 10. This bleeder ply permits rapid detection and vacuum pumping of small leaks if they occur in the vacuum jackets 32 and 34 during tests.

The container 10 is fabricated by constructing a winding mandrel 50 of polystyrene foam that is machined to match the inside contour of the container. The winding mandrel 50 shown in FIG. 1 is assembled on a hollow steel shaft 52 that is designed to transmit torque to the mandrel through a pair of blades that fold into the shaft. A steel bushing is provided to position the fill tube 18 on the shaft 52, and the mandrel 50 is designed to be removed from the container by dissolving and washing out with safety solvents.

The first portion of the container 10 to be fabricated is the cryogenic liner 24 which comprises three separate components; a dome 54 on each end and a cylindrical center section 56. Fabrication of the liner 24 begins with spin forming the dome shells 54. While spin forming was chosen for economic reasons in fabricating a single tank, it is contemplated that other techniques suitable for forming aluminum, such as vacuum forming, will be used where a larger number of containers are required.

Each shell is formed from a laminate of the type shown in FIG. 3 having a thickness of 0.005 inch that is first sandwiched between two 0.050-inch thick aluminum sheets and then spun to the desired dome shape. After spinning, the heavier aluminum sheets are carefully removed leaving a spun AMA dome 54.

The assembly of the cryogenic liner 24 over the foam mandrel 50 begins with the installation of that portion of the insulation system 22 at the upper dome 12 of the container 10 on the mandrel 50. The dome 54 of the cryogenic liner 24 for the upper dome 12 is bonded to a flange on the fill tube 18 to become a part of the top insulation dome assembly in a manner which will be described later. The bottom AMA dome is then assembled on the mandrel 50, and a single sheet of prestretched 0.0024-inch thick AMA is wrapped over the mandrel to form the central cylindrical section 56. This AMA sheet is bonded with a lap joint seam 58 at the base of each dome 54 and with a single longitudinal lap joint seam 60. Doubler strips of 0.0017-inch AMA are bonded to the seams 58 and 60 to complete the cryogenic liner assembly. Leak tightness of the liner assembly is verified by mass spectrometer helium leak detector techniques.

After the cryogenic liner 24 has been assembled on the mandrel 50 the insulation system 22 is then assembled. The insulation system 22 is divided into three components to facilitate its fabrication. These components are similar to those of the cryogenic liner 24 and include a top dome section 62, a cylindrical center section 64 and a bottom insulation dome section 66. To provide dome end sections 62 and 66 having a minimum of seams in the vacuum-tight covers, the jackets 32 and 34 of these dome sections are fabricated as one-piece shells in the same manner as the dome sections 54 of the cryogenic liner 24.

Fabrication of the upper insulation dome section 62 utilizes a foam-in-place technique wherein inner and outer spun vacuum jackets 32 and 34 of the previously described AMA material are placed in contact with mating halves of a foaming mold. The fill tube 18 is secured to the outer vacuum jackets 32, and a dry bleeder ply of glass cloth 40 is bonded to the inner surface of this vacuum jacket. The glass cloth to vacuum jacket bond is made with a thin film of pigmented polyamide epoxy resin painted on the surface of the aluminum foil 38 and allowed to reach a tacky state before applying the glass cloth layer 40. This procedure provides an excellent bond with a minimum resin migration into the bleeder cloth.

The foam-in-place process employs liquid resins which ordinarily would impregnate the dry cloth 40 that is placed against the outer vacuum jacket 32 before the foam resin is poured. Resin or foam impregnation would seriously hamper the effectiveness of the bleeder ply 40. To prevent this undesirable foaming resin impregnation and to provide good adhesion between the bleeder cloth 40 and the foam 30 a sprayed in place cocoon is utilized as a barrier media. The cocoon application relies on a polyester resin formulated to be air gun sprayed so that a tacky spider web 67 of resin is applied upon the glass cloth bleeder 40 to build up a thick cocoon-like skin that is impervious to the foaming resin. The tacky spider web of resin adheres to but does not permeate the glass cloth 40. This barrier film 67 of polyester resin is sprayed over the entire inner surface of the glass cloth 40 and is oven dried to form the skin.

A similar glass bleeder ply 42 is secured in a like manner to the inner vacuum jacket 34, and a resin barrier film 69 is applied to the glass cloth in the same manner. The inner vacuum jacket 34 is bonded to the fill tube 18, and the proper spacing between the vacuum jackets 32 and 34 is controlled by a plug positioned in the foaming mold. This spacing was maintained at 0.5 inch for aforementioned tank, and foam resin is poured into the space between the vacuum jackets 32 and 34.

The foam begins to rise as soon as it is poured into the mold, and this foam is allowed to reach an initial cure in 30 minutes at room temperature followed by an oven post cure at 120° for 8 hours. The excess foam is trimmed away, and the foaming mold is opened. Final trimming is achieved by sanding the foam and AMA jackets to a predetermined trim line. The dome is then removed from the mold, and a formed AMA channel with attendant doubler strips is bonded to the base of the dome section 62. The channel provides a gas conductance path between the inner and outer bleeder plies which enables the dome to be tested for leaks before final assembly on the mandrel 50.

The bottom insulation dome section 66 is fabricated in the manner similar to the top insulation dome section 62. However, no fill tube is used with the bottom dome section 66.

The center cylindrical section 64 of the insulation system 22 is constructed from a polyurethane foam cylinder having an outside diameter machined to a 0.50-inch wall thickness from a 3-inch wall thick cylinder created by the foam-in-place technique. The heavy wall thicknesses are utilized to achieve the uniform foam density throughout the cylinder 64. This heavy walled cylinder is foamed between a Teflon coated mandrel and a cylindrical sheet metal shroud centered about the Teflon coated mandrel with approximately 3-inch radial clearance being provided.

Prior to foaming, the Teflon coated mandrel is first wrapped with four plies of glass cloth having a release agent sprayed over each layer. The purpose of these plies is to provide a bleeder for removing foam gases that would otherwise be trapped on the inside surface of the foam cylinder. A fifth layer of finer cloth is then applied over the aforementioned four plies of glass cloth to retard foam resin migration into the bleeder.

After foaming and while still on the Teflon coated mandrel, the heavy wall foam cylinder is machined to the 0.50 inch wall thickness. The outside surface of the foam cylinder is then covered with a layer 40 of glass cloth to form a bleeder ply, and the outer vacuum jacket 32 of prestretched 0.0024 inch AMA is applied.

The foam cylinder is removed from the Teflon coated mandrel, and the four plies of glass cloth are peeled away from its inner surface. The layer of fine cloth reinforces the inner surface of the foam to prevent foam tearout when these four plies are peeled out.

The inside surface of the foam cylinder likewise has a layer of glass cloth 34 bonded to the foam 30, and the vacuum jacket 34 is applied to this glass cloth. The cylindrical section 64 is then trimmed to length, and a channel with a doubler strip is bonded to each end. The cylindrical section 64 is then leak tested with the inner and outer bleeder plies in gaseous communication through the end channels.

As stated earlier, the top dome section 62 of the insulation system 22 is mounted on the mandrel 50 at the same time as the top dome 54 of the cryogenic liner 24 because all of the AMA material of both the insulation 22 and the liner 24 is bonded to the fill tube 18 thereby forming a single unit. To complete the assembly of the insulation 22 over the mandrel 50 and the cryogenic liner 24, the center cylindrical section 64 of the insulation system 22 is slipped onto the mandrel 50 and positioned against the previously assembled upper dome section 62 to form a butt joint 68. The bottom insulation dome section 66 is then placed on the mandrel 50 and pushed in place against the cylindrical center section 64 to form a butt joint 70. Circumferential spliced strips of AMA laminate and AMA doubler strips are bonded to the butt joints 68 and 70 between the insulation components.

In order to interconnect the bleeder ply 40 of each insulation component 62, 64 and 66, a plurality of bleeder patches 72 and 74 are added at each butt joint 68 and 70. Each bleeder patch 72 and 74 comprises a glass cloth strip overlapping holes in the outer vacuum jacket 32, and an AMA cover fly is applied over the glass cloth. These holes were used to leak test the domes and cylindrical section. A large AMA doubler strip is then bonded over each patch 72 and 74. With the addition of the bleeder patches 72 and 74, the entire insulation bleeder ply system has an interconnected gas conductance path which is vented to a pressure tap 76 permanently installed in the bottom insulation dome 66.

Utilizing the pressure tap 76, the completed insulation assembly 22 is leak tested. A helium leak detector is connected to the pressure tap 76, and the entire insulation assembly 22 is evacuated through the bottom dome insulation assembly 66 by way of the bleeder patches 72 and 74. Helium gas is sprayed over the exterior surface of the insulation 22, and a leak detector monitors for indication of helium pick-up.

The mandrel 50 and the insulation assembly 22 is then mounted in a turret type filament winding machine. The exterior surface of the entire insulation 22 is cleaned to insure adequate adhesion of the filament-wound glass roving 26. The surface is primed with a resin which is allowed to reach tacky state before the wrapping is started.

To apply longitudinal wrap, the mandrel 50 is tilted to the wrap angle and then revolved past a fixed distributor head guiding wet resin impregnated glass roving 26. At the same time, the mandrel precesses about its axis to a precise indexing for a uniform distribution of the glass roving 26 over the surface of the insulation. The longitudinal wrap is one complete 360° covering which has two layers of glass roving 26.

The application of the circumferential wrap rovings 28 follows the longitudinal wrapping. In this operation, the mandrel axis is horizontal, and the mandrel 50 is rotated at a rate synchronized to the lateral movement of the roving distributor head to provide precise indexing for uniform wrap of wet resin impregnated glass roving 28 onto the longitudinally wrapped roving 26. The complete circumferential wrap is four layers of glass rovings 28 applied on the cylindrical section 14 of the tank 10.

The resin which impregnates the rovings 26 and 28 is partially cured with the mandrel 50 rotating. The filament-wound structural shell 20 is then completely cured at a long-term low temperature post cure cycle that is not detrimental to the foam insulation 30. If desired, a roving preimpregnated with a dry resin can be used with a long cure.

After curing the filament-wound outer shell 20, the polystyrene foam mandrel 50 is completely removed. This is accomplished by withdrawing the blades into the shaft 52 and pouring a solvent, such as trichlorethane, into the shaft to soften the adjacent portion of the foam. The shaft 52 is carefully withdrawn from the mandrel 50 and the fill tube 18.

Additional solvent is poured into the fill tube 18, and the tank 10 is slowly rotated to distribute the solvent in the mandrel 50. The solvent is then removed, and the operation is then repeated until all foam is dissolved. The inside of the container 10 is finally rinsed.

While a preferred form of the invention has been described, it will be appreciated that various modifications may be made without departing from the spirit of the invention or the scope of the subjoined claims. For example, the ends 54 of the cryogenic liner 24 and the vacuum jackets 32 and 34 in the ends 62 and 66 of the insulation system 22 have dome-shaped configurations which are formed as single components. Each of these components may be formed in several sections and joined together for other configurations.

What is claimed is:
1. A method of fabricating a container for storing cryogenic material comprising the steps of
forming a winding mandrel of a polystyrene foam having an external configuration the same as the internal configuration of the container,
placing an impermeable cryogenic liner on said mandrel,
assembling insulation on said liner, winding resin impregnated filaments about said insulation, curing said resin impregnated filaments to form a structural shell, and removing the winding mandrel from the interior of the container.

2. A method of fabricating a container for storing cryogenic material as claimed in claim 1 including the step of dissolving the polystyrene foam in the interior of the container by pouring a solvent into the mandrel.

3. A method of making insulation for a cryogenic storage tank in a foaming mold of the type having a pair of mating parts which are assembled in spaced relationship comprising the steps of covering layers of metal foil with layers of plastic film to form laminates, positioning one of said laminates in contact with one of the mating parts of the foaming mold, positioning another of said laminates in contact with another of the mating parts of the foaming mold, coating the surfaces of said laminates facing away from the contacting mold parts with epoxy resin, applying layers of glass cloth to said coated surfaces whereby said layers of glass cloth are bonded to said surfaces by said epoxy resin, spraying polyester resin on said layers of glass cloth, drying said polyester resin to form barrier films on said layers of glass cloth, assembling the parts of the foaming mold in spaced relationship, and pouring a foaming resin into a space between the mating parts of said assembled foaming mold whereby the foaming takes place adjacent the glass cloth and said barrier film retards impregnation of said glass cloth by said foam so that the glass cloth forms a bleeder ply adjacent the laminates.

References Cited

UNITED STATES PATENTS

| | | | |
|---|---|---|---|
| 2,639,252 | 5/1953 | Simon et al. | 264—45 |
| 2,642,920 | 6/1953 | Simon et al. | 264—45 |
| 2,728,702 | 12/1955 | Simon et al. | 264—45 |
| 2,802,766 | 8/1957 | Leverenz | 264—45 |
| 3,196,735 | 7/1965 | Baldwin | 102—101 |
| 3,239,092 | 3/1966 | Levenetz | 156—173 |
| 3,286,004 | 11/1966 | Hill et al. | 264—45 |
| 3,372,075 | 5/1968 | Holt et al. | 156—172 |

CARL D. QUARFORTH, Primary Examiner

B. H. HUNT, Assistant Examiner

U.S. Cl. X.R.

156—173; 264—45